United States Patent
Liu et al.

(10) Patent No.: US 9,009,049 B2
(45) Date of Patent: Apr. 14, 2015

(54) RECOGNITION OF SPEECH WITH DIFFERENT ACCENTS

(71) Applicant: Spansion LLC, Sunnyvale, CA (US)

(72) Inventors: Chen Liu, Woodridge, IL (US); Richard Fastow, Cupertino, CA (US)

(73) Assignee: Spansion LLC, Sunnyvale, CA (US)

( * ) Notice: Subject to any disclaimer, the term of this patent is extended or adjusted under 35 U.S.C. 154(b) by 217 days.

(21) Appl. No.: 13/669,926

(22) Filed: Nov. 6, 2012

(65) Prior Publication Data
US 2014/0129218 A1    May 8, 2014

(51) Int. Cl.
  *G10L 15/28*    (2013.01)
  *G10L 15/00*    (2013.01)
  *G10L 15/32*    (2013.01)
  *G10L 15/187*   (2013.01)

(52) U.S. Cl.
  CPC ............... *G10L 15/32* (2013.01); *G10L 15/005* (2013.01); *G10L 15/187* (2013.01)

(58) Field of Classification Search
  USPC ................................................ 704/231–257
  See application file for complete search history.

(56) References Cited

U.S. PATENT DOCUMENTS

| | | | |
|---|---|---|---|
| 5,806,033 A * | 9/1998 | Lyberg | 704/255 |
| 7,912,721 B2 | 3/2011 | Dow et al. | |
| 2002/0087315 A1 | 7/2002 | Lee et al. | |
| 2004/0148164 A1 | 7/2004 | Baker | |
| 2006/0020462 A1 | 1/2006 | Reich | |
| 2006/0020463 A1* | 1/2006 | Reich | 704/257 |
| 2008/0147404 A1* | 6/2008 | Liu et al. | 704/256.2 |
| 2008/0177543 A1* | 7/2008 | Nagano et al. | 704/253 |
| 2010/0121640 A1 | 5/2010 | Zheng et al. | |
| 2011/0066434 A1 | 3/2011 | Li et al. | |

OTHER PUBLICATIONS

International Search Report and Written Opinion of the International Searching Authority for International Application No. PCT/US2013/068452, mailed Feb. 18, 2014.

* cited by examiner

*Primary Examiner* — Jesse Pullias
(74) *Attorney, Agent, or Firm* — Sterne, Kessler, Goldstein & Fox PLLC

(57) ABSTRACT

Computer-based speech recognition can be improved by recognizing words with an accurate accent model. In order to provide a large number of possible accents, while providing real-time speech recognition, a language tree data structure of possible accents is provided in one embodiment such that a computerized speech recognition system can benefit from choosing among accent categories when searching for an appropriate accent model for speech recognition.

17 Claims, 10 Drawing Sheets

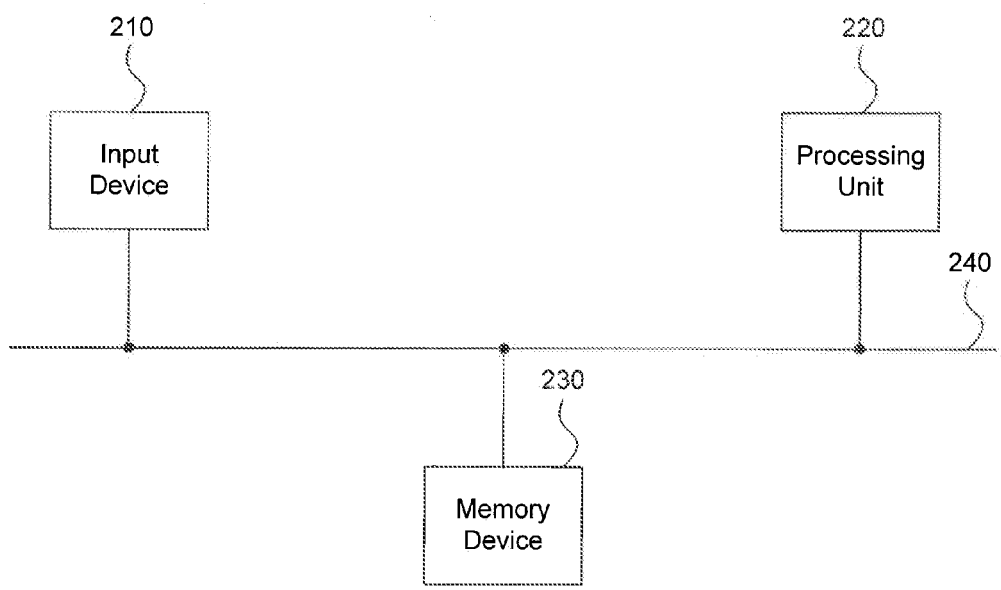
FIG. 2
(Conventional)

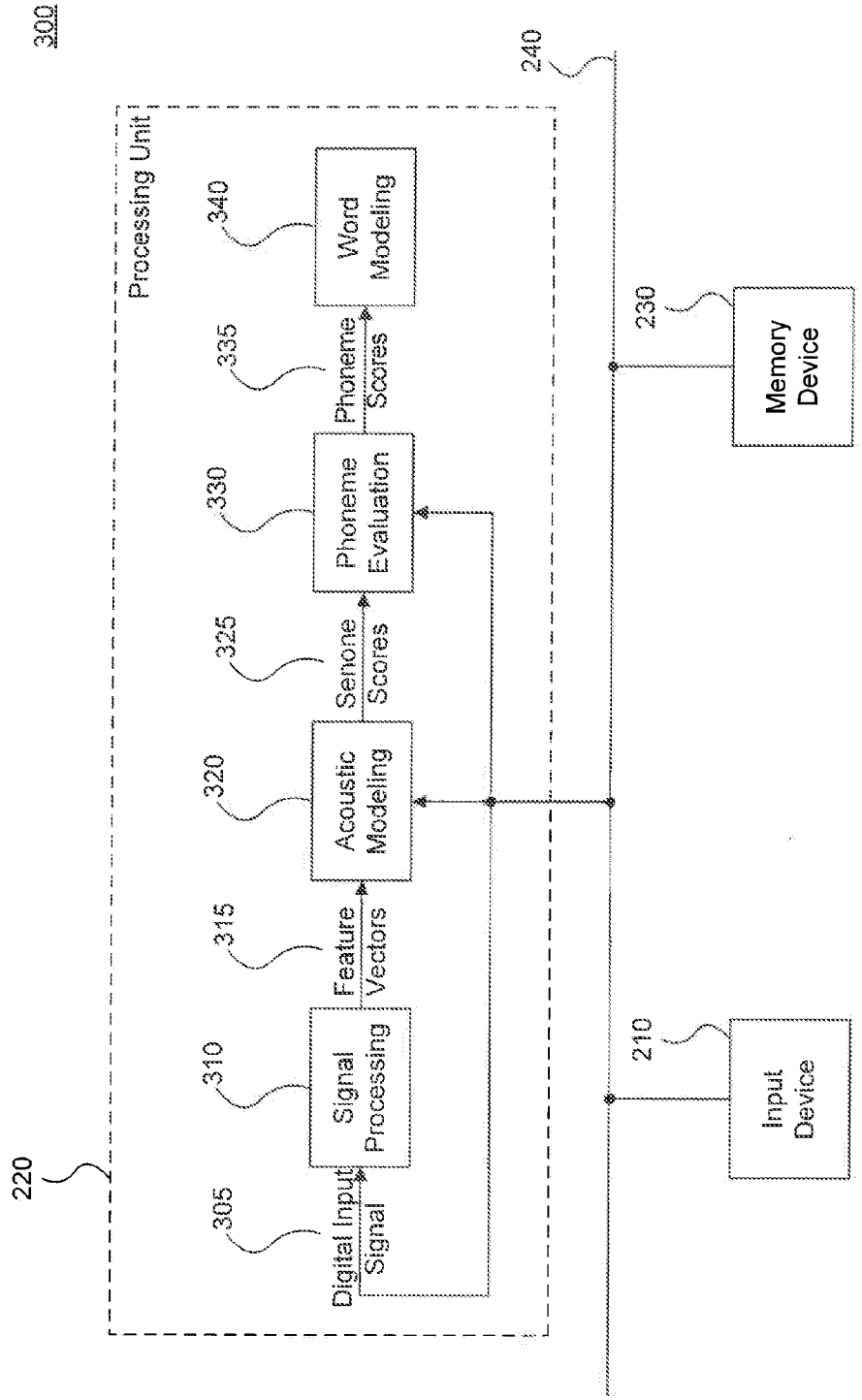
FIG. 3
(Conventional)

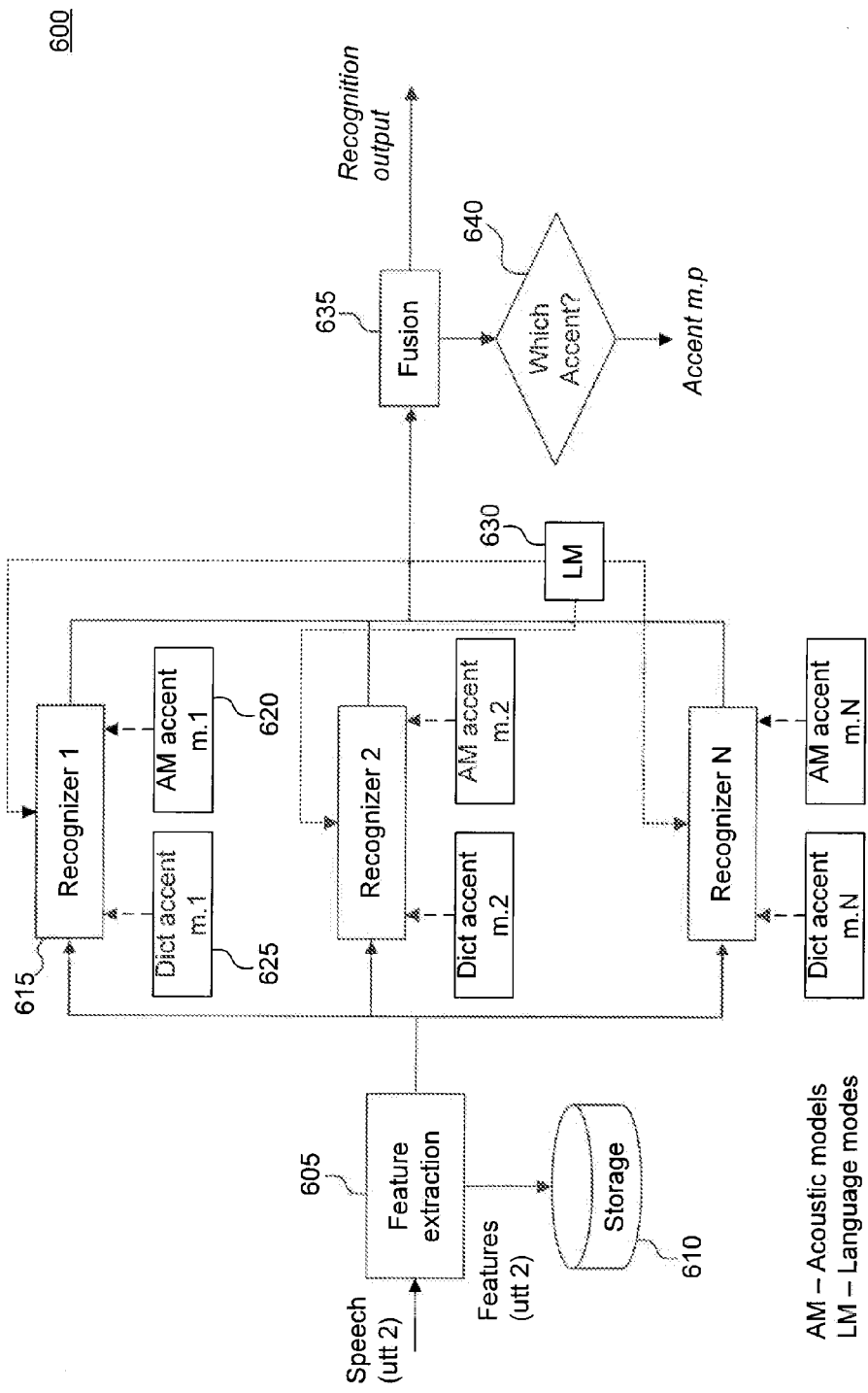

RECOGNITION OF SPEECH WITH DIFFERENT ACCENTS

CROSS REFERENCE TO RELATED APPLICATION

This application is related to U.S. patent application Ser. No. 13/489,799, filed Jun. 6, 2012, titled "Acoustic Processing Unit," which is incorporated by reference in its entirety.

BACKGROUND

1. Technical Field

The present disclosure is generally related to speech recognition, and more particularly to improving recognition of speech with different accents.

2. Background

Speech recognition systems are becoming increasingly popular. Systems such as interactive voice response telephone systems provide users with experiences intended to create the sensation of speaking to a machine. At the same time, users can become quite frustrated when such a system doesn't work, either by misunderstanding the user or by asking the user to repeat themselves.

A challenge has been speakers with accents. While humans have the mental capacity to understand many different accents, this still poses a challenge for computer-based speech recognition systems. One approach has been to create a table for the computer system to be able to identify which accent a user is speaking with. Unfortunately, this table-based approach is difficult to implement for more than a small number of accents because of issues such as the table size and the processing capability required to consider all of the various possible accents in the system.

SUMMARY

Therefore, there is a need to improve performance of speech recognition, particularly for speakers who have an accent.

In one embodiment, a method for recognizing speech, comprising loading a digital representation of a first human utterance, processing the digital first utterance with a first accent category model, processing the digital first utterance with a second accent category model, selecting a category of accents based on results from the processing the first accent category model and the processing the second accent category model, selecting a plurality of accent models belonging to the selected category of accents, loading a digital representation of a second human utterance, processing the digital second utterance with each of the selected plurality of accent models, and fusing the results of the processing the digital second utterance to produce a recognition output.

In another embodiment, an apparatus for speech processing, comprising a first comparison module configured to determine a selected accent category based on whether a first accent category model or a second accent category model is a better match for a first human sound to be captured from an audio transducer, and a second comparison module configured to determine which accent model of a plurality of accent models is a best match for a second human sound to be captured from the audio transducer, wherein the plurality of accent models is associated with the selected accent category.

In yet another embodiment, a non-transitory computer readable storage medium, comprising instructions for a processor to process a first accent category model and a second accent category model, conditional instructions to process a first plurality of accent models based on a result of the first accent category model, wherein accents represented in the first plurality of accent models are within a category represented by the first accent category model.

Further features and advantages, as well as the structure and operation of various embodiments, are described in detail below with reference to the accompanying drawings. It is noted that the disclosure is not limited to the specific embodiments described herein. Conversely, it may be that an embodiment is not inventive, but its disclosure herein may further enable other embodiments. Such embodiments are presented herein for illustrative purposes only. Additional embodiments can be apparent to persons skilled in the relevant art based on the teachings contained herein.

BRIEF DESCRIPTION OF THE DRAWINGS

The accompanying drawings, which are incorporated herein and form a part of the specification, illustrate embodiments and, together with the description, further serve to explain the principles of the disclosure and to enable a person skilled in the relevant art to make and use the disclosed technology.

FIG. 2 is an illustration of a speech recognition system.

FIG. 3 is an illustration of a speech recognition system with speech recognition processes performed by an individual processing unit.

FIG. 6B is an illustration of speech recognition processes for a second utterance based on a selected accent from the speech recognition processes of FIG. 6A.

DETAILED DESCRIPTION

The following detailed description refers to the accompanying drawings that illustrate embodiments consistent with this disclosure. Other embodiments are possible, and modifications can be made to the embodiments within the spirit and scope of the disclosure. Therefore, the detailed description is not meant to limit the scope of the disclosure.

The technologies disclosed can be implemented in many different embodiments of software, hardware, firmware, and/or the entities illustrated in the figures. Thus, the operational behavior of embodiments disclosed herein will be described with the understanding that modifications and variations of the embodiments are possible, given the level of detail presented herein.

The embodiments described, and references in the specification to "one embodiment", "an embodiment", "an example embodiment", "certain embodiments" etc., indicate that the embodiments described can include a particular feature, structure, or characteristic, but every embodiment might not necessarily include the particular feature, structure, or characteristic. Moreover, such phrases are not necessarily referring to the same embodiment, though efforts have been made to refer to the same embodiment for clarity. Further, when a particular feature, structure, or characteristic is described in connection with an embodiment, it is understood that it is within the knowledge of one skilled in the art to effect such feature, structure, or characteristic in connection with other embodiments whether or not explicitly described.

Speech Recognition Systems

Figure 1:
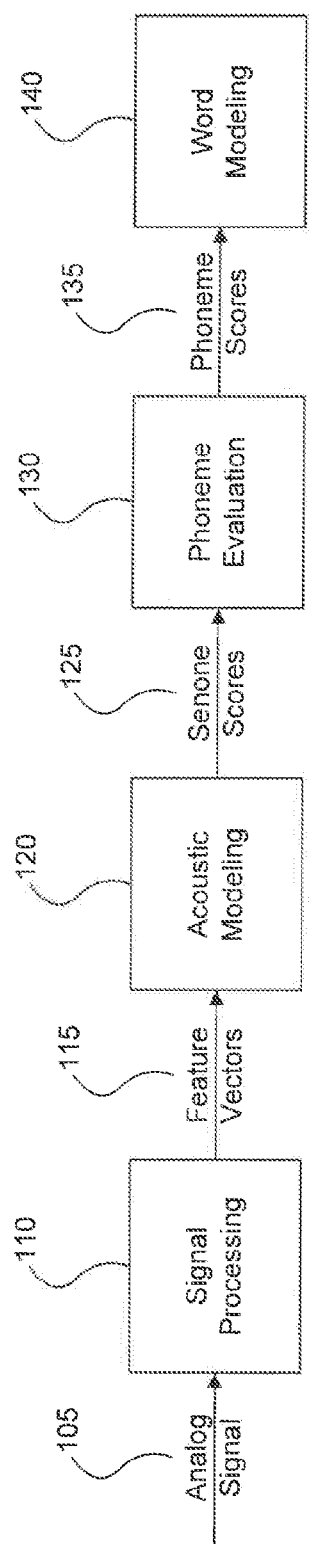
FIG. 1 is an illustration of an exemplary flowchart of a speech recognition process.

FIG. 1 is an illustration of an exemplary flowchart of a speech recognition process 100. Speech recognition process 100 includes a signal processing stage 110, an acoustic modeling stage 120, a phoneme evaluation stage 130, and a word modeling stage 140.

In signal processing stage 110, an analog signal representation of an incoming voice signal 105 can be filtered to eliminate high frequency components of the signal that lie outside the range of frequencies that the human ear can hear. The filtered signal is then digitized using sampling and quantization techniques well known to a person skilled in the relevant art. One or more parametric digital representations (also referred to herein as "feature vectors 115") can be extracted from the digitized waveform using techniques such as, for example, linear predictive coding and fast Fourier transforms. This extraction can occur at regular time intervals, or frames, of approximately 10 ms, for example.

In acoustic modeling stage 120, feature vectors 115 from signal processing stage 110 are compared to one or more multivariate Gaussian probability distributions (also referred to herein as "Gaussian probability distributions") stored in memory. The one or more Gaussian probability distributions stored in memory can be part of an acoustic library, in which the Gaussian probability distributions represent senones. A senone refers to a sub-phonetic unit for a language of interest, as would be understood by a person skilled in the relevant art. An individual senone can be made up of, for example, 8 components, in which each of the components can represent a 39-dimension Gaussian probability distribution.

Acoustic modeling stage 120 can process over 1000 senones, for example. As a result, the comparison of feature vectors 115 to the one or more Gaussian probability distributions can be a computationally-intensive task, as thousands of Gaussian probability distributions, for example, can be compared to feature vectors 115 every time interval or frame (e.g., 10 ms). A set of scores for each of the senones represented in the acoustic library (also referred to herein as "senone scores") results from the comparison of each of feature vectors 115 to each of the one or more Gaussian probability distributions. Acoustic modeling stage 120 provides senone scores 125 to phoneme evaluation stage 130.

In phoneme evaluation stage 130, Hidden Markov Models (HMMs) can be used to characterize a phoneme as a set of states and an a priori set of transition probabilities between each of the states, where a state is associated with a senone. For a given observed sequence of senones, there is a most-likely sequence of states in a corresponding HMM. This corresponding HMM can be associated with an observed phoneme. A Viterbi algorithm can be used to find the likelihood of each HMM corresponding to a phoneme.

The Viterbi algorithm performs a computation that starts with a first frame and then proceeds to subsequent frames one-at-a-time in a time-synchronous manner. A probability score is computed for each senone in the HMMs being considered. Therefore, a cumulative probability score can be successively computed for each of the possible senone sequences as the Viterbi algorithm analyzes sequential frames. Phoneme evaluation stage 130 provides the phoneme likelihoods or probabilities 135 (also referred to herein as a "phoneme score") to word modeling stage 140.

In word modeling stage 140, searching techniques are used to determine a most-likely string of phonemes and subsequent words, over time. Searching techniques such as, for example, tree-based algorithms can be used to determine the most-likely string of phonemes.

FIG. 2 is an illustration of a second speech recognition system 200. Speech recognition system 200 includes an input device 210, a processing unit 220, a memory device 230, and a data bus 240, all of which are separate physical components. Memory device 230 can be, for example, a Dynamic Random Access Memory (DRAM) device that is external to processing unit 220 and in communication with processing unit 220 via data bus 240. Input device 210 is also in communication with processing unit 220 via data bus 240. Data bus 240 has a typical bus width of, for example, 8 to 32 bits.

Input device 210 is configured to receive an incoming voice signal (e.g., incoming voice signal 105 of FIG. 1) and convert acoustical vibrations associated with the incoming voice signal to an analog signal. The analog signal is digitized using an analog to digital converter (not shown in FIG. 2), and the resulting digital signal is transferred to processing unit 220 over data bus 240. Input device 210 can be, for example, a microphone. Microphones are a well known example of an audio transducer. In various embodiments, dynamic, condenser, fiber optic or MEMS microphones can be used.

Processing unit 220 is configured to process the digital input signal in accordance with the signal processing stage 110, acoustic modeling stage 120, phoneme evaluation stage 130, and word modeler stage 140 described above with respect to FIG. 1. FIG. 3 is an illustration of speech recognition system 200 with speech recognition modules performed by processing unit 220. Processing unit includes signal processing module 310, acoustic modeling module 320, phoneme evaluation module 330, and word modeling module 340, which operate in a similar manner as signal processing stage 110, acoustic modeling stage 120, phoneme evaluation stage 130, and word modeler stage 140 of FIG. 1, respectively.

In reference to FIG. 3, signal processing module 310 can convert a digital input signal representation of incoming voice signal 305 (e.g., from input device 210) into one or more feature vectors 315. Acoustic modeling module 320 compares one or more feature vectors 315 to one or more Gaussian probability distributions stored in an acoustic library in memory device 230. That is, for each of the comparisons of one or more feature vectors 315 to the one or more Gaussian probability distributions, processing unit 220 accesses memory device 230 via data bus 240. For an acoustic library with thousands of senones (in which each of the senones is composed of a plurality of Gaussian probability distributions), not only are the comparisons performed by acoustic modeling module 320 computationally-intensive but the thousands of accesses to memory device 230 via data bus 240 by acoustic modeling module 320 are also computationally-intensive and time consuming. The thousands of accesses to memory device 230 is further exacerbated by the bus width of data bus 240 (e.g., typically 8 to 32 bits), in which multiple accesses to memory device 230 can be required by acoustic modeling module 320 to access each Gaussian probability distribution. Further, interconnect parasitics associated with data bus 240 can corrupt data transfer between memory device 230 and acoustic modeling module 320.

Phoneme evaluation module 330 receives senone scores 325 from acoustic modeling module 320. As discussed above with respect to speech recognition process 100 of FIG. 1, HMMs can be used to characterize a phoneme as a set of states and an a priori set of transition probabilities between each of the states, where a state is composed of a sequence of senones. The sets of states and a priori sets of transition probabilities used by phoneme evaluation module 330 can be stored in memory device 230. Phoneme evaluation module 330 provides phoneme scores 335 to word modeling module 340.

Word modeling module 340 uses searching techniques such as, for example, tree-based algorithms to determine a most-likely string of phonemes (e.g., most-likely phoneme 335), and subsequent words, over time.

For each comparison of one or more feature vectors 315 to the one or more Gaussian probability distributions stored in memory device 230, memory device 230 is accessed by processing unit 220. As a result, significant computing resources are dedicated to the acoustic modeling process, in turn placing a significant load on processing unit 220. The load placed on processing unit 220 by the acoustic modeling process affects the speed at which processing unit 220 can process digital signals from input device 210 as well as data from other applications (e.g., where processing unit 220 can operate in a multiuser/multiprogramming environment that concurrently processes data from a plurality of applications). Further, for computing systems with limited memory resources (e.g., handheld devices), the acoustic modeling process not only places a significant load on processing unit 220, but also consumes a significant portion of memory device 230 and bandwidth of data bus 240. These issues, among others, with processing capabilities, speed, and memory resources are further exacerbated by the need to process incoming voice signals in real-time or substantially close to real-time in many applications.

In an embodiment, the acoustic modeling process is performed by a dedicated processing unit (also referred to herein as an "Acoustic Co-Processor" or "ACP"). The ACP operates in conjunction with processing unit 220 of FIG. 3 (also referred to herein as a "Central Processing Unit" or "CPU"). For example, the ACP receives one or more feature vectors (e.g., feature vectors 315 of FIG. 3) from the CPU, calculates a senone score (e.g., senone score 325 of FIG. 3) based on one or more Gaussian probability distributions, and outputs the senone score to the CPU. In an embodiment, the one or more Gaussian probability distributions can be stored in the ACP. Alternatively, in another embodiment, the one or more Gaussian probability distributions can be stored externally to the ACP, in which the ACP receives the one or more Gaussian probability distributions from an external memory device. Based on the architecture of the ACP, an accelerated calculation for the senone score is achieved.

Further details on the ACP can be found in U.S. patent application Ser. No. 13/489,799, filed Jun. 6, 2012, titled "Acoustic Processing Unit," which is incorporated by reference in its entirety. The ACP is referred to as an Acoustic Processing Unit (APU) in U.S. patent application Ser. No. 13/489,799.

Although portions of the present disclosure is described in the context of a speech recognition system, a person skilled in the relevant art will recognize that the embodiments described herein are applicable to any data pattern recognition applications based on the description herein. These other data pattern recognition applications include, but are not limited to, image processing, audio processing, and handwriting recognition. These other data pattern recognition applications are within the spirit and scope of the embodiments disclosed herein.

Figure 4:
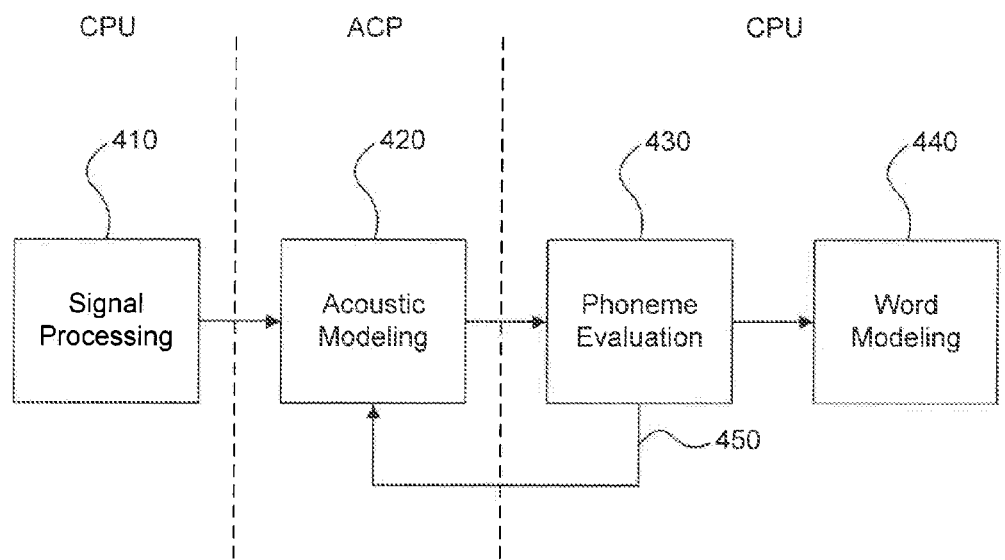
FIG. 4 is an illustration of speech recognition processes performed by an Acoustic Co-Processor (ACP) and a Central Processing Unit (CPU).

FIG. 4 is an illustration of an embodiment of a speech recognition process 400 performed by the ACP and CPU. In an embodiment, the CPU performs a signal processing process 410, a phoneme evaluation process 430, and a word modeling process 440. The ACP performs an acoustic modeling process 420. Signal processing process 410, acoustic modeling process 420, phoneme evaluation process 430, and word modeling process 440 operate in a similar manner as signal processing stage 110, acoustic modeling stage 120, phoneme evaluation stage 130, and word modeler stage 140 of FIG. 1, respectively, except as otherwise described herein.

In reference to the embodiment of FIG. 4, feedback 450 is an optional feature of speech recognition process 500, in which phoneme evaluation process 430 can provide an active senone list to acoustic modeling process. The ACP can compare one or more feature vectors to one or more senones indicated in the active senone list. Such feedback 450 is further discussed below.

In another embodiment, acoustic modeling process 420 can compare the one or more feature vectors to all of the senones associated with an acoustic library. In this case, feedback 450 is not required, as phoneme evaluation process 430 receives an entire set of senone scores (e.g., "score all" function) from the ACP for further processing.

Accents and Data Structures Therefor

Figure 5:
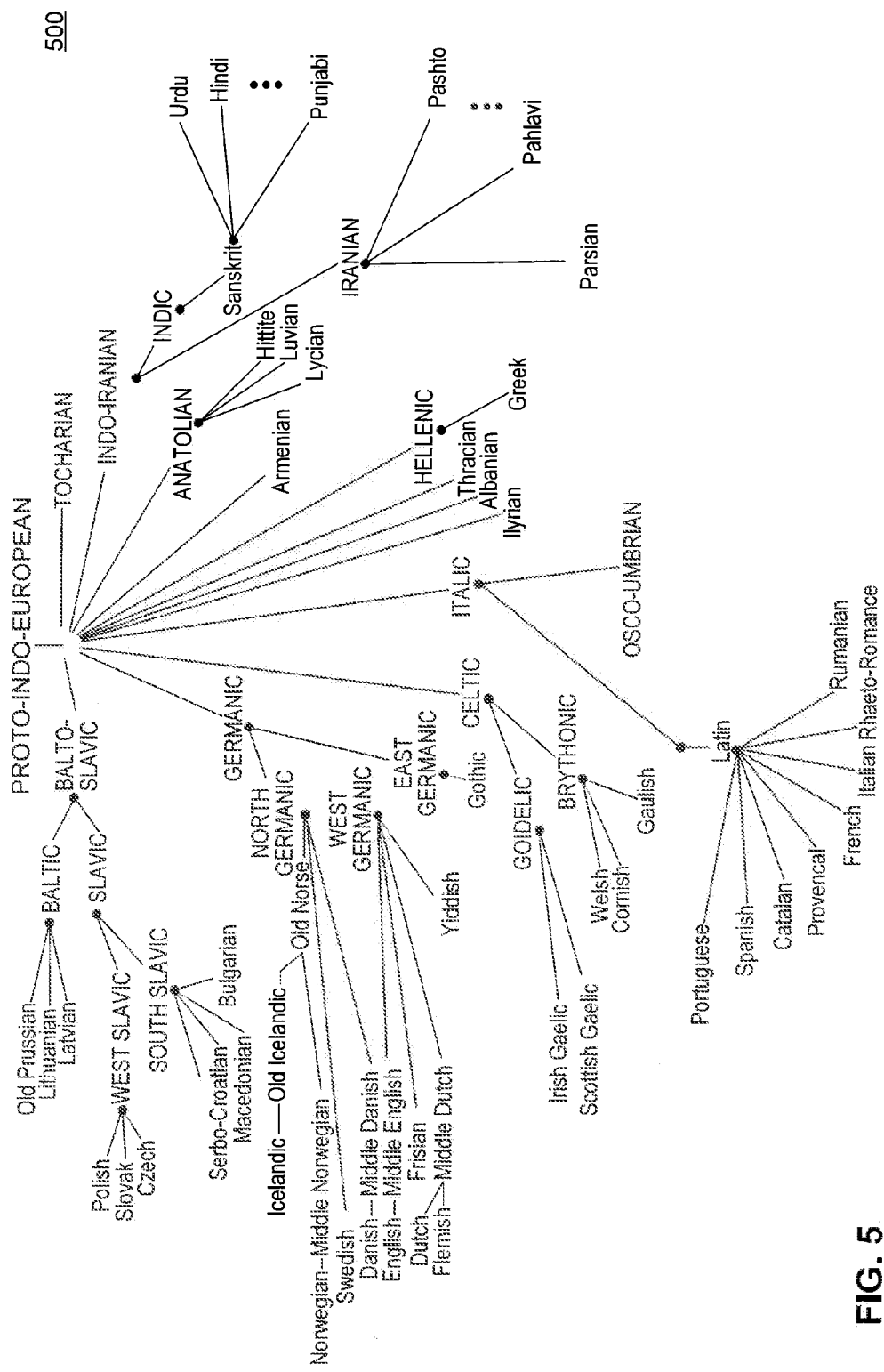
FIG. 5 is an illustration of an exemplary language tree.

FIG. 5 depicts an exemplary language tree 500. The term "language tree" is used because language tree 500 is a tree data structure whose nodes are languages that represent possible mother tongues. At the root node is "proto-indo-european," a reconstructed common ancestor of Indo-European languages. The theory is that several thousand years ago, this single language was spoken that has since developed into a large family of languages, ranging from Polish to Punjabi. Certain languages, such as Japanese, do not have a widely accepted common ancestry with the proto-indo-european family. Rather, Japanese is a part of the Japonic family of languages, which has Proto-Japonic as a root node of a language tree, and includes dialects such as Eastern Japanese and Western Japanese. As shown in FIG. 5, the proto-indo-european language has a sub-branch named "Germanic," corresponding to a family of languages with a common ancestor known as "Proto-Germanic." Proto-Germanic can serve as a common ancestor, and thus as a node in the language tree 500, whether or not it was ever spoken. Certain languages depicted in language tree 500, such as Thracian, are no longer spoken.

A common source of accent in speaking a given language, such as English, is the language that the speaker grew up speaking (sometimes known as a "mother tongue"). For instance, someone who grew up speaking French is likely to pronounce English words in a way that demonstrates that French is their mother tongue. A computer performing automatic speech recognition can experience a 10% improvement, for example, in speech recognition by using models specific to the human speaker's accent, rather than simply models specific to the language being spoken. In other words, a computer can more accurately process a French speaker's English if the computer is trained for English as spoken by a French person rather than simply English.

"Accent" can refer to how the words sound, and also which words are used. For example, a Canadian accent model can have a higher frequency of the word "eh," (pronounced \'ā, 'e, 'a(i)) which can signal anticipated agreement from the listener. Similarly, language tree 500 of FIG. 5 can contain dialects in addition to languages. A dialect can be a sociolect, a regiolect, a topolect or a historical cognate to another language. In certain cases, an accent might not be related to a different language, for example, "Brooklynites" (e.g., people from Brooklyn, N.Y. USA) generally have a different accent than people who speak with a Texas drawl.

Given that having the right accent model can improve speech recognition, a computer can be programmed to recognize a word with a variety of different acoustic models such that the computer can determine which accent model provides the highest likelihood of being correct (as many speech recognizers output a score in addition to a most likely word or sound). However, if there are one hundred different possible accents, for example, the computer can be faced with the computationally-intensive task of processing a user's utterance for each of the one hundred possible accents.

One way to avoid processing the one hundred accents is to search for the right accent. The data structure of language tree 500 provides an approach to searching for a native language (or dialect, geographic origin, or other source of an accent) that provides an accent. In an embodiment, by navigating to a most-likely branch of each node, a search algorithm is able to prune the unselected branches, and their sub branches, from the search space. Language tree 500 is particularly useful for this task as leaf node languages (e.g., Swedish, Italian, Urdu and Greek) are classified by elements of the language that can be expected to appear in most senones. In other words, given a user's utterance, the utterance can be classified according to a branch of language tree 500.

Certain speakers can have an accent that is not reflected in language tree 500. For example, someone with diplomatic parents can grow up with an accent that reflects multiple languages, or someone grew up in a community with an accent not reflected in language tree 500. In certain embodiments, as described below, the speaker's accent can be processed with the closest accent in language tree 500. In other embodiments, a fusion engine (e.g., fusion engine 635 of FIG. 6A, which is described below) can select a predicted word as a function of multiple accents.

In certain embodiments, language tree 500 can include multiple language families (e.g., Japonic and Uralic). In certain embodiments, language tree 500 can exclude certain languages, perhaps to be more efficient if there is a reason that a particular accent is unlikely to be used, e.g., systems designed for use in South America can have a reduced set of Balto-Slavic languages, such as not modeling Macedonian. Conversely, this same system can have additional accents for Iberian Romance languages such as, for example, Asturian, Aragonese, Catalan, Galician, Ladino, Leonese, Mirandese and Portuguese.

In certain embodiments, language tree 500 can be implemented with different tree data structures, such as a binary tree, a red-black tree, an AVL tree or a splay tree. Certain language trees 500 can be implemented where any language in a category can be used as representative of the category (which can be useful for self-balancing trees), as described herein. In such a situation, accent categories may change dynamically. In certain embodiments, language tree 500 can be a balanced tree structure, i.e., each node at a given depth has (as close as possible) the same number of children. One advantage to such a structure is that the number of iterations to traverse language tree 500 can be known. In certain cases, the worst case traversal length can be minimized, which can be relevant to determining a critical path length. One approach to balancing language tree 500 can be to include or exclude languages, as per above. In an embodiment, another approach to balancing language tree 500 can be to reorganize which branches a given language falls under. Language tree 500 can be limited to a maximum number of children per node of a number such as, for example, two, three, four, six or other single digit. Larger maximum numbers can also be employed.

A person of ordinary skill in the art will recognize that other types of language trees and data structures can be used with the embodiments described herein. For ease of reference, language tree 500 will be referenced below for explanatory purposes.

A Parallel Processing Speech Recognition System

Figure 6A:
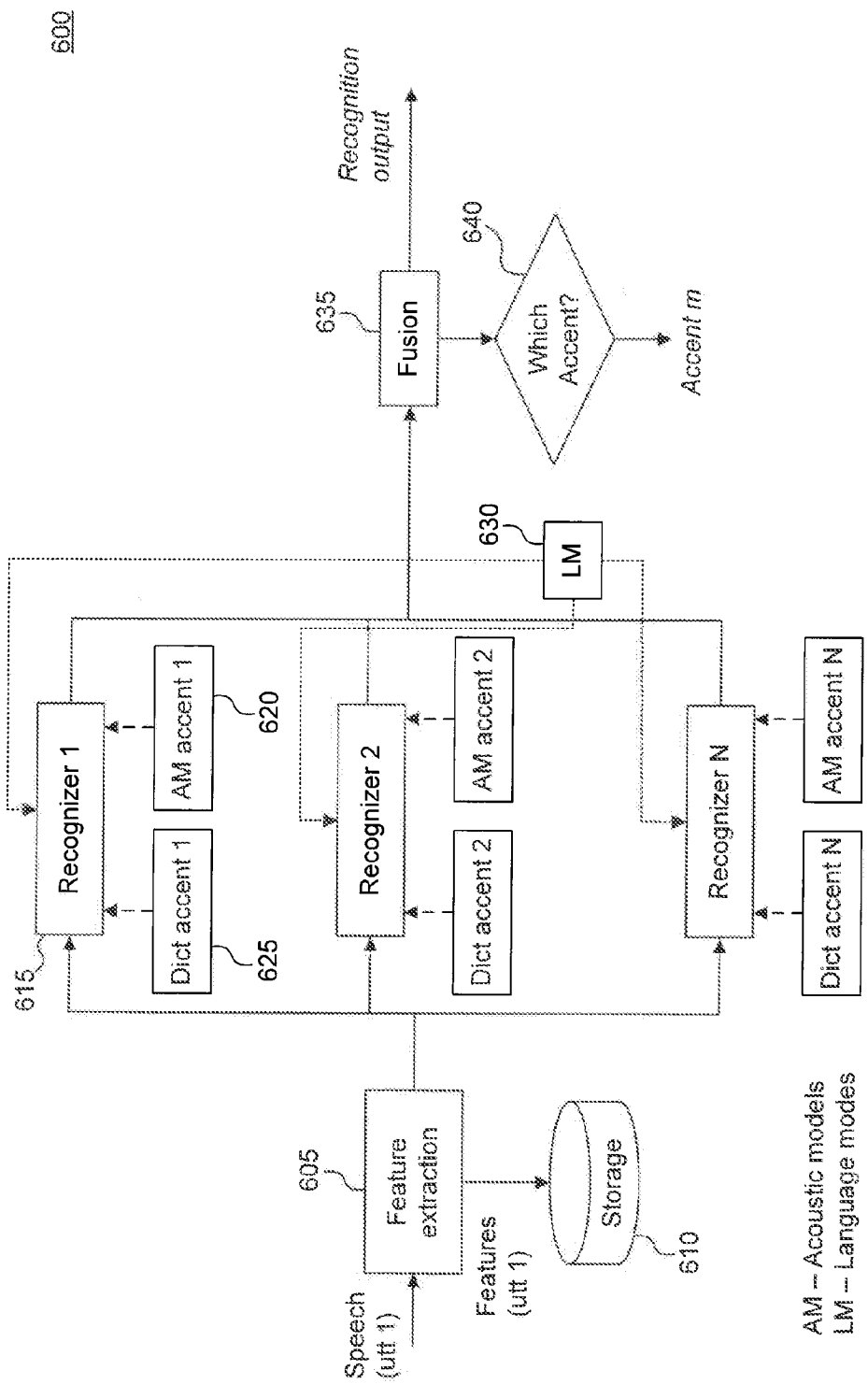
FIG. 6A is an illustration of speech recognition processes with parallel processing of potential accents.

FIG. 6A depicts an automatic speech recognition system 600, according to an embodiment. Dashed lines denote that a feature is optional to this embodiment. Arrows denote the flow of data, but are not limiting, e.g., feature extraction 605 can receive data from storage 610.

Feature extraction 605 can be used to process an utterance. One example of a feature extraction engine 605 can be signal processing stage 110 of FIG. 1. In one embodiment, feature extraction 605 can be hardware, such as a section of an acoustic co-processor (e.g., the ACP in FIG. 4), that produces feature vectors 115 of FIG. 1. One advantage of dedicated hardware is that processing time can be reduced. In other embodiments, feature extraction software algorithms can be implemented on a processor. In further embodiments, partially customized hardware can work in concert with software, such as a processor coupled to an application specific integrated circuit.

Storage 610 can receive data from feature extraction 605. Storage 610 can be implemented on a variety of computer readable mediums, such as hard drives, flash memory, volatile memory, network attached storage and optical drives. In one embodiment, storage 610 can keep copies of feature vectors 115 generated by feature extraction engine 605. This can allow these feature vectors 115 to be reprocessed later, potentially for improved accuracy.

Examples of computer readable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nano-technological storage devices, etc.), and communication mediums (e.g., wired and wireless communications networks, local area networks, wide area networks, intranets, etc.). Computer readable media also include custom hardware, such as application specific integrated circuits or other types of dedicated hardware, such as a digital signal processor. Computer readable media also include mask ROM, EPROM, EEPROM, PROM, flash memory, customized reconfigurable hardware (such as FPGAs, PLD, PLAs and others).

In speech recognition system 600, parallel recognizers 615 are employed. As with other components of some of the exemplary systems, various recognizers 615 can be implemented with various features, but are still labeled with "615." Similarly, identifiers such as "615" can refer to a single instance, and can also refer to a plurality of instances, including all instances, in part because devices such as recognizers 615 can be used individually or in a plurality. In certain embodiments, recognizer 615 can include phoneme evaluation module 430 and word modeling module 440 of FIG. 4. In certain embodiments, recognizer 615 can further include an acoustic modeling module 420 of FIG. 4. In certain embodiments, dynamic time warping can be implemented. This technique of speeding up or slowing down speech can be useful for understanding a speaker with a particularly quick or slow accent, as Polynesian speakers tend to produce fewer syllables per minute than French or Japanese speakers, for example.

Recognizer 615 can be implemented in an application specific integrated circuit, a field programmable gate array, a digital signal processor, a set of threads implementing an algorithm on a processor or other computational approach.

Advantageously, recognizer 615 receives input from an acoustic model 620. In one embodiment, acoustic model 620 can be implemented as acoustic modeling module 420 of FIG. 4. In an embodiment, acoustic model 620 represents an accent or accent category (e.g., a node in language tree 500). In one embodiment, an accent category is a type of accent (e.g., a node of language tree 500). In certain embodiments, an accent can be limited to leaf nodes of language tree 500 and in other embodiments, an accent can be limited to languages that a user could speak (as opposed to "Japonic").

In certain embodiments, an accent category may have an associated acoustic model 620. In such an embodiment, acoustic model 620 may be trained on each of the acoustic models corresponding to lower nodes in language tree 500. For example, according to FIG. 5, the Baltic accent category's acoustic model 620 can be trained on the acoustic models 620 for Old Prussian, Lithuanian and Latvian. In this same embodiment, acoustic model 620 for the accent category Balto-Slavic can be a combination of acoustic models 620 of Baltic and of Slavic, or acoustic model 620 for the accent category Balto-Slavic can be a combination of acoustic models 620 of the fifteen leaf nodes under Balto-Slavic. In certain embodiments, an acoustic model can be trained with only a fraction of the lower nodes' acoustic models 620 (perhaps to save on development costs). In another embodiment, such as a splay tree, acoustic model 620 can be trained on a single language, e.g., each node in language tree 500 corresponds to a spoken language, and the languages in language tree 500 are be arranged in the tree based on their similarities.

In an embodiment with 10 parallel recognizers 615, system 600 can receive a first utterance, which after feature extraction 605, can be simultaneously fed into one recognizer 615 for each child node of language tree 500 root node. If system 600 were to implement language tree 500 of FIG. 5, it is likely that extinct categories of accents, such as Tocharian and Anatolian, can be excluded. Similarly, extinct languages, such as Illyrian, Phrygian and Thracian can also be excluded. In certain embodiments, where an internal node has only one child, the internal node can be deleted. For example, Hellenic is a parent only to Greek, so it can be more efficient to have Greek depend directly from Proto-Indo-European. Thus, one recognizer 615 can be fed an acoustic model 620 representative of Balto-Slavic languages whereas a second recognizer 615 can be coupled to an acoustic model 620 of Celtic languages. As there can be only 8 child nodes (Balto-Slavic, Germanic, Celtic, Italic, Albanian, Greek, Armenian and Indo-Iranian), the remaining ninth and tenth recognizers 615 can be left dormant, or dispatched to other processing. In one embodiment, it can be determined that the additional cost of maintaining certain languages, e.g., Celtic, might not be justified by the small number of speakers combined with the small increase in performance over the next closest category of accents. In certain embodiments, a plurality of processor cores can be available to system 600 such that the system can utilize, for example, one processor for every 4 recognizers 615 required (e.g., each recognizer 615 is implemented as a thread on the processor). Hardware to implement recognizers 615 may be allocated dynamically, such as in cloud computing.

In reference to FIG. 6A, an accent pronunciation dictionary 625 can optionally be provided to recognizer 615. In one embodiment, accent pronunciation dictionary 625 provides a pronunciation for each lexical entry corresponding to the accent in question. Such information can be used for forming Hidden Markov Model for various words for computing the likelihood of the words. Accent pronunciation dictionary 625 can also provide multiple pronunciations for words that are typically pronounced in more than one way in an accent.

In certain embodiments, each recognizer 615 is identical to every other recognizer 615, and each acoustic model 620 will have identical structuring of data and hardware and each accent pronunciation dictionary 625 will have identical structuring of data and hardware. In certain embodiments, there can be one accent pronunciation dictionary 625 that is paired with each acoustic model 620. In certain embodiments, certain acoustic models 620 might not have an accent pronunciation dictionary 625, where speakers are likely to have an accent similar to a baseline dictionary used (and/or stored) in a recognizer 615.

In certain embodiments, different recognizers 615 can be used to conserve resources because certain accents are better processed with different types of recognition technology, as per examples above. Similarly, different acoustic models 620 can be used to better represent the sounds a human speaker can utter. In such an embodiment, recognizer 615 can have parallel hardware for processing more than one acoustic model 620. In certain embodiments, recognizer 615 can be equipped with more than one acoustic model 620, where a second acoustic model 620 contains information on certain rare sounds in an accent.

In certain embodiments, parallel recognizers 615 can be implemented with different algorithms. For example, if the maximum number of child nodes of any given node in language tree 500 is 8 system 600 of FIG. 6A can implement 16 recognizers 615 such that each accent can be processed as both a male or female voice.

In certain embodiments, an accent can be used as both an accent and an accent category. For example, language tree 500 similar to that of FIG. 5 can have an interior node for Spanish. The Spanish node can have children of Catalan, Provençal, French and Portuguese (to name a few). In reference to FIG. 6A, a fusion engine 635 can receive results from recognizers 615 corresponding to Catalan, Provençal, French and Portuguese as well as Spanish. If Spanish is selected in "Which Accent?" module 640, system 600 can continue processing speech associated with an interior node of a language tree 500 (i.e., Spanish is the selected accent as well as an accent category). One advantage to having an accent as both an accent and an accent category is that a system 600 may be able to reduce the number of recognizers 615 used as it not processing accent categories in addition to the set of accents. Another advantage to being able to use an accent as representative of an accent category is that it can enable data structures such as splay trees where there is not a distinction between interior nodes and leaf nodes. One reason that an accent chosen from a category may be able to serve as a representative of that category is if language tree 500 has been constructed, or designed, such that any two accents in a category are more similar to each other than any two accents in different categories.

In certain embodiments, recognizers 615 can consider input from a language model 630. In one embodiment, language model 630 can be implemented as a subset of a word modeling module 440 of FIG. 4. In one embodiment, language model 630 can be implemented as a list of all words in a language and their respective frequencies. In another embodiment, language model 630 can be implemented with Bayesian frequencies, such that language model 630 can provide the likelihood of a word being spoken given the previous word. In another embodiment, language model 630 can provide the likelihood of a word appearing given grammatical structure, such as the algorithms used to generate blue wavy lines by the Formatting Consistency Checker found in Microsoft Word® 2007 and later. In another embodiment, language model 630 can use Markov models to determine the likelihood of a word given previous words or utterances. In some embodiments, language model 630 can use a combination of the above techniques. In some embodiments, language model 630 can be fed into each recognizer 615. In other embodiments, language model 630 can be fed into a subset of recognizers 615. In one embodiment, there can be a different language model 630 for each recognizer 615, and in some embodiments, language model 630 can be connected solely to certain recognizers 615, e.g., ones implemented in dedicated hardware.

In one embodiment, recognizer 615 can output a word and a likelihood score of that word being correct. For example, a set of recognizers 615 can produce [Beer, 75%], [Ear, 70%], [Year, 71%] and [Tear, 63%] from a particular utterance. Scores can be provided as a percentage, a range of 1 out of 5, linear values, logarithmic values, or other scoring arrangement. These scores can be a frequency reported from language model 630, or can be based on data from accent pronunciation dictionary 625, an acoustic model 620 or a combination of the three. In certain embodiments, a score can be generated, at least in part, directly by recognizer 615, as recognizer 615 determines how well an utterance corresponds to one or more possible words.

Fusion engine 635 can select a most likely word based on the results of recognizers 615. In one embodiment, fusion engine 635 can select the word with the highest score. In the above example, fusion engine 635 can select "beer" as its score of 75% is the highest score. In another embodiment, fusion engine 635 can be able to consider more than one result from one or more recognizers 615. In another example, fusion engine 635 can receive [beer, 75%], [sear, 74%], [sear, 71%] and [near, 68%]. Fusion engine 635 can select "sear" over "beer" even though "beer" has the highest absolute score because multiple recognizers 615 produced "sear." Another version of fusion engine 635 can add points to the highest score for "sear" based on its having been selected by more than one recognizer 615. In yet another embodiment, fusion engine 635 can discern word similarity, such that if a set of recognizers 615 produced [high, 63%], [hi, 64%], [I, 69%], [eye, 67%] and [oh, 73%], fusion engine 635 can be able to determine that "oh" is not part of a cluster of similar sounds registered by recognizers 615. Such fusion engine 635 can track performance of recognizers 615 or acoustic models 620 such that recognizers 615 or acoustic models 620 that are consistently right or wrong are weighted accordingly. In certain embodiments, fusion engine 635 can be able to recognize that 'I' and "eye" are often pronounced the same, and thus treat these two as matching responses (using a language model 630 to pick a recognition output).

In various embodiments, fusion engine (or fusion module) 635 can have a tie-breaking algorithm. One tie breaking algorithm can be to select the first recognizer 615 to produce a result of the otherwise tied recognizers 615. Another tie breaking algorithm can be to select the lowest numbered recognizer 615 the first time, the second lowest recognizer 615 during the second tie and so forth. In one embodiment, a counter may be used to track the number of ties that have occurred, and then modulo the total number of ties with the number of recognizers 615 employed to avoid a situation in which there are thirteen ties and five recognizers 615. Without computing a modulo, this might fail because there is not a thirteenth recognizers 615. Modulo would find that five goes evenly into thirteen twice, with a remainder of three, and thus returns three (which can be mapped to a recognizer 615).

In certain embodiments, a recognition output might not be a text word. For example, in a voice control application, a user can be presented with a choice of: "raise the temperature"; "lower the temperature"; "warm the room"; "cool the room"; and other thermostat related commands. Whether the user says "cool the room" or "lower the temperature," fusion engine 635 can output a '1' signifying that the thermostat should engage an air conditioning system to lower the room's temperature.

In an embodiment, fusion engine 635 can weight results of recognizers 615 based on a likelihood of that the associated accent (or category of accents) being spoken, e.g., if system 600 were installed at a Polish restaurant, fusion engine 635 can apply a preference for Polish accents. In one embodiment, fusion engine 635 can store results of previously-chosen accents, such that this distribution can be used to select a most likely word from among results from recognizers 615. In such an embodiment, each result from a particular recognizer 615 can be correlated to a particular accent or accent category. In another embodiment, fusion engine 635 can store the last one hundred or one thousand accents selected, and in another embodiment, fusion engine 635 can store accents detected over the last day, week or month. Such limitations can conserve hardware resources, and can help accommodate shifting populations, such as at a convention center, where the accents of attendees of a first conference might not be informative for the accents of attendees of a second conference.

In certain embodiments, fusion engine 635 can be configured to change fusion algorithms. For example, if selecting between more than four potential accents, fusion engine 635 can be configured to consider the similarity (e.g., placement on language tree 500 of FIG. 5) of high scoring acoustic models 620, whereas if there are four or fewer potential accents, fusion engine 635 can simply select the one with the highest score. Similarly, certain embodiments can change fusion algorithms based on available power, such that more complex algorithms are used if there is a power grid based power supply (as opposed to a battery-based power supply).

A Fusion Process

Figure 7:
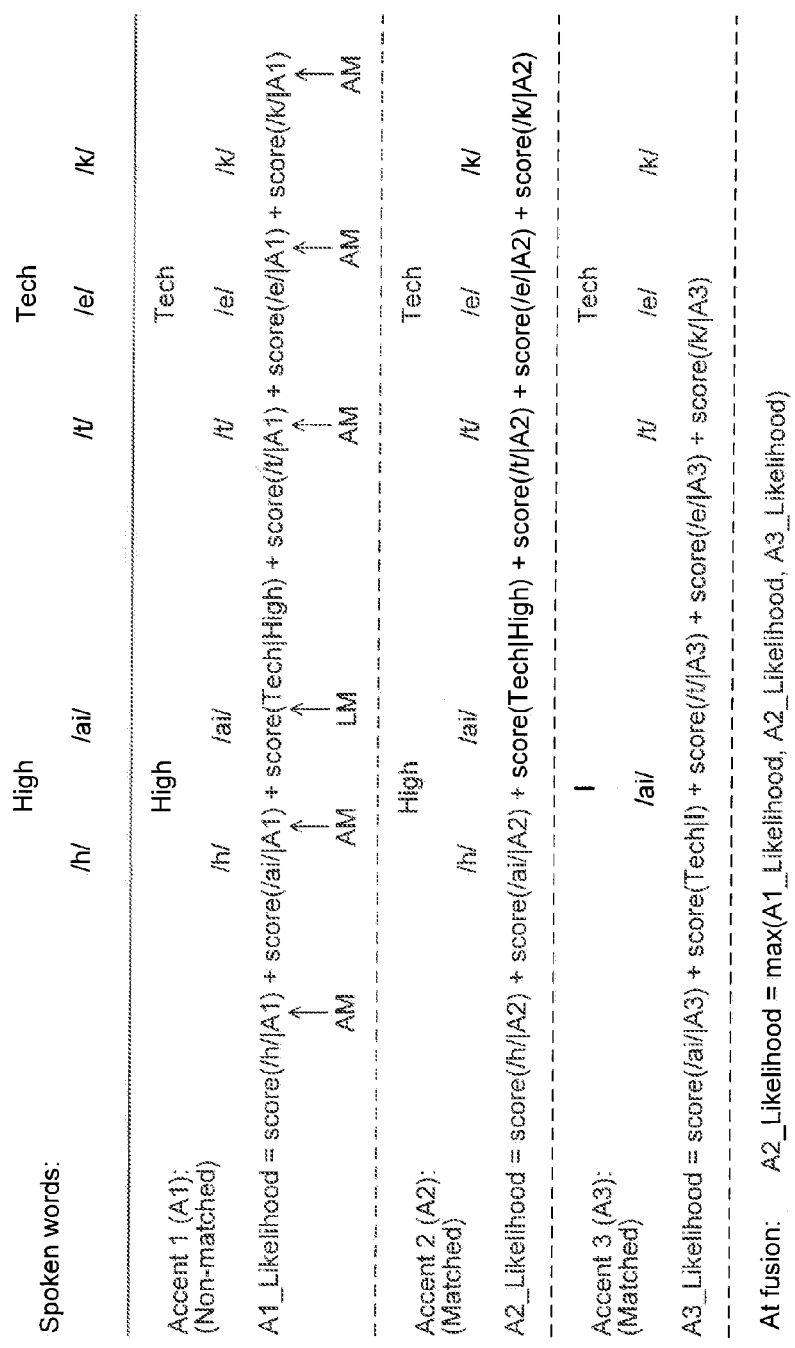
FIG. 7 is an illustration of speech recognition for the phrase "high tech."

FIG. 7 illustrates an algorithm of how recognizers 615 and fusion engine 635 of FIG. 6A can process an exemplary phrase "high tech," according to an embodiment. The top section, labeled "spoken words" shows the phrase "high tech" and its corresponding pronunciation key. The three sections below are labeled Accent 1, Accent 2, and Accent 3, and each of these three can correspond to a recognizer 615. Accent 2, abbreviated A2, is labeled "matched" because, as per the bottom section, accent 2 will be selected during fusion. Each accent section of FIG. 7 depicts the words that the recognizer 615 is matching the feature vectors (not shown) to. Presumably, Accent 3 provides the lowest score because it is guessing "I tech" rather than "high tech." In the embodiment of FIG. 7, each recognizer (associated with each of Accent1, Accent2, and Accent 3) employs the same scoring algorithm. As labeled in Accent 1, the score is the sum of a series of Bayesian probabilities. "AM" stands for accent model, and refers to information provided by, for example, acoustic model 620 of FIG. 6A. "LM" stands for language model and refers to information provided by, for example, language model 630 of FIG. 6A. The function for computing A1_Likelihood consists of a series of posterior probabilities, i.e., the probability=(hypothesis|evidence) where the '|' means given. In other words, if recognizer 615 has observed evidence (here, result of acoustic model 620 for Accent1) what is the likelihood that the original sound was /h/? Language model 630 is used to determine the probability that the word "tech" was spoken given that the word "high" was recognized. These scores are summed to determine A1_Likelihood. Many recognizers 615 will process smaller units of speech, but processing multiple words at a time is helpful as an explanatory aid (e.g., for language model 630) and can be implemented where speed of recognition is less critical. In the embodiment of FIG. 7, fusion engine 635 determines an output by selecting the recognizer 615 with the highest score.

Returning to FIG. 6A, once fusion engine 635 selects a recognition output from one or more recognizers 615, it can also determine, via "Which Accent?" module 640, an associated accent or accent category. In one embodiment, fusion engine 635 can have selected the third recognizer 615 for a first utterance. Fusion engine 635 can then determine that the third recognizer 615 corresponds to "Celtic." When fusion engine 635 processes a second utterance, it can select the result from the second recognizer 615, corresponding to "Brythonic." For the third utterance, fusion engine 635 can select the first recognizer 615, or "Welsh."

In an embodiment, fusion engine 635 has two functions. The first function is to identify and select the winning accent or accent category (e.g., accent or accent category associated with the highest score) as described above. Its second function is to combine complementary accents or accent categories. This most likely occurs when a speaker grows up in different language regions and his or her spoken English is affected by more than one other language or dialect. In this case, fusion engine 635 can find that an accent or accent category consistently wins (e.g., produces the highest scores) for some phonemes or words, while a different accent or accent category consistently wins for other phonemes or words from the same speaker. In this situation, instead of selecting one winning accent or accent category, fusion engine 635 keeps two (or more) accents or accent categories active, correspondingly traversal along the language tree will proceed along two distinct branches, and the final recognition results will come from the best of the two or more recognizer outputs, according to an embodiment of the present invention. As a result, "Which Accent?" module 640 is configured to understand that the speaker is influenced by more than one language.

For each utterance processed, fusion engine 635 can notify "Which Accent?" module 640 of the accent selected. As discussed above, this can simply be identifying a recognizer 615 selected during fusion. In another embodiment, fusion engine 635 can have a local copy of language tree 500 of FIG. 5 loaded such that it can output an identifier unique to language tree 500 for any given node. In another embodiment, "Which Accent?" module 640 can translate between a series of winning recognizers 615 and a particular node in language tree 500. In one embodiment, "Which Accent?" module 640 can be tasked with updating recognizers 615 for the next utterance. For example, as per above, "Which Accent?" module 640 can be notified that fusion engine 635 has identified a Celtic speaker. Therefore, "Which Accent?" module 640 can instruct recognizers 615 to load new acoustic models 620 and new accent pronunciation dictionary 625 based on the Celtic accent. "Which Accent?" module 640 can then provide the first recognizer 615 a memory address of acoustic model 620 and accent pronunciation dictionary 625 corresponding to Goidelic and provide the second recognizer 615 a memory address of another acoustic model 620 and another accent pronunciation dictionary 625 corresponding to Brythonic. In another embodiment, "Which Accent?" module 640 can load (e.g., overwrite) the present acoustic model 620 and accent pronunciation dictionary 625 and then, in certain embodiments, notify recognizers 615 to reload their acoustic models 620 and accent pronunciation dictionary 625, and in other embodiments this changeover can be transparent to recognizers 615.

In other embodiments, controlling the loading of different accent models can be performed by the fusion engine 635 and in other embodiments, some aspects of the loading can be performed by recognizers 615 (e.g., translating between a selected accent node and the corresponding acoustic model 620 and accent pronunciation dictionary 625). "Which Accent?" module 640 can store selected accents or other data to storage 610. Storage 610 can keep a list, array or other data structure of all of the accents and accent categories selected. Storage 610 can also only keep the most recent accent or accent category selected, or a window of, for example, the 10 most recent accents. In certain embodiments, once an accent has been selected, similar or close acoustic models 620 can also be used to process future utterances to make use of parallel hardware incorporating recognizers 615 (as opposed to recognizers 615 staying dormant to conserve power).

System 600 is also illustrated in FIG. 6B. In FIG. 6A, system 600 is shown processing a first utterance, and selecting an accent 'm'. In FIG. 6B, system 600 has loaded a second utterance. Acoustic models 620 and accent pronunciation dictionaries 625 of FIG. 6B are loaded with acoustic models m . . . 1 . . . N 620 and accent pronunciation dictionaries m . . . 1 . . . N 625, as the notation "m . . . X" refers to acoustic model X 620 of accent category 'm' and accent pronunciation dictionary X 625 of accent category 'm'. For example, referring to FIG. 5, if system 600 processes a first utterance and selects Anatolian as the accent 'm', then acoustic model m . . . 1 620 may be Hittite, acoustic model m . . . 2 620 may be Luvian and the Nth model, acoustic model m . . . N 620 may be Lycian. Similarly, accent pronunciation dictionary m . . . 1 625 may be Hittite, accent pronunciation dictionary m . . . 2 625 may be Luvian and the Nth model, accent pronunciation dictionary m . . . N 625 may be Lycian.

In certain embodiments, in reference to FIG. 6A, system 600 can switch to the accent currently used for speech recognition. In one embodiment, once a long enough pause (e.g., a silence of predetermined length such as 30 seconds or five minutes) has elapsed, system 600 can reset such that recognizers 615 are loaded with accents from the child nodes of a root node of language tree 500. In other embodiments, this refreshed state can be entered upon explicit command from a user, such as activating a physical or graphical button, saying a certain phrase or other input. In certain embodiments, system 600 can detect that an accent is not producing satisfactory results. For example, fusion engine 635 can determine that if the highest score for an utterance is below a certain threshold, e.g., 40 out of 100, the utterance should be reprocessed without an accent model. In other embodiments, fusion engine 635 can determine that if the highest score for a series of utterances (e.g., three in a row) are below a certain threshold (e.g., 7 out of 20), then the utterance(s) should be processed from at least one node up in language tree 500 (in other words, acoustic models 620 are changed back at least one state each). Various embodiments can use various combinations of these techniques. Certain embodiments can record scores and resets to assist in future debugging, accent model selection, language tree 500 design and other engineering efforts.

In certain embodiments, multiple approaches to speech recognition can be employed. For example, a call center can utilize embodiments to process speech from callers. Various systems 600 can be implemented on backend servers (not shown). When a new caller is received, their utterances can be processed by a system similar to that depicted in FIG. 6A. However, once a final accent has been determined (e.g., the "Which Accent?" module 640 has selected a leaf node of language tree 500) the caller can be passed to a simplified system 600 such that there is only one recognizer 615, obviating the need for fusion engine 635 and "Which Accent?" module 640. Such an embodiment can be referred to as a hybrid embodiment because two different methods of speech recognition are used, one after the other. In such an embodiment, recognizer 615 of the second system 600 might not have an accent pronunciation dictionary 625 even though the first system 600 did. In another embodiment, speech can be recorded such that a system similar to that in FIG. 6A can be used to output a real-time transcription, but the sound can be reprocessed later with more detailed acoustic models 620. Such an approach can be useful in a voicemail system such that a voice-mailbox owner can receive an email with a rough transcription, but a more detailed transcription is available for later text searches (and the more detailed transcription can be performed at off hours, such as at night).

Certain embodiments of system 600 of FIG. 6A can be particularly well suited to voice control applications or devices. This is particularly true where speakers can change accents with some frequency. For example, applications involving travel, such as checking in to an airline or renting a car, might wish to install a kiosk that accepts voice commands. Other exemplary voice control applications include home appliances, such as a washing machine or a drying machine, or cell phone control, such as voice activated dialing, internet searching or composing emails (e.g., on a smartphone). Additional applications include interactive voice response systems, GPS devices and heads up displays, such as those found in aircraft.

Figure 8:
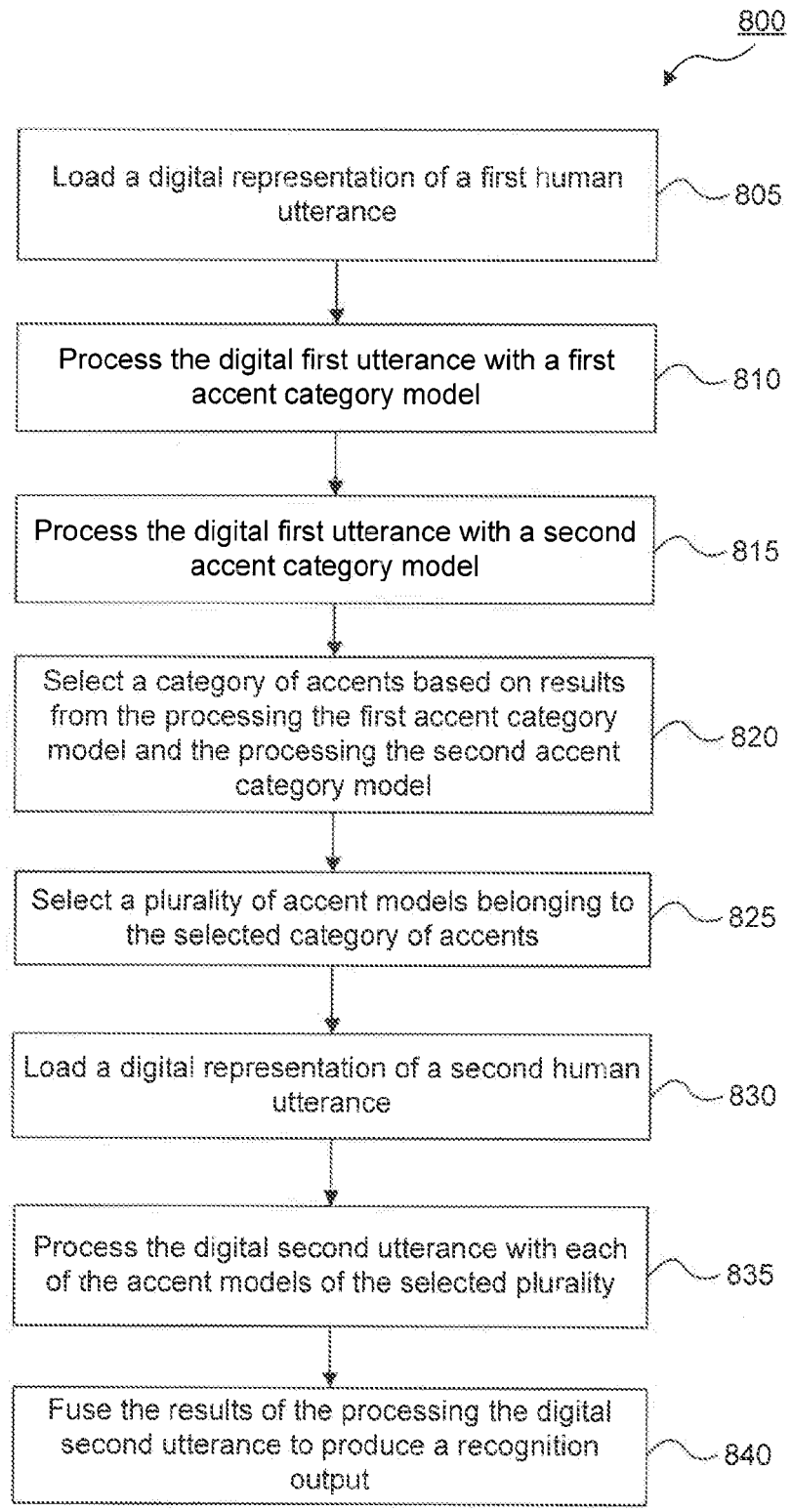
FIG. 8 is an illustration of another exemplary flowchart of a speech recognition process.

FIG. 8 illustrates an exemplary method 800 for speech recognition utilizing techniques discussed herein. It is to be appreciated that not all steps discussed below may be required, or be required to be performed in the order described.

Method 800 begins with step 802. In step 802, a digital representation of a first human utterance can be loaded from a non-transitory computer readable storage medium. In an exemplary embodiment, a person may call a call center. The telephone call can be answered by an integrated voice response system, which can ask the user to say their telephone number. In such a situation, the system can know that it will receive ten separate numbers (in the United States). If the caller begins with "two" (\'tü\), this sound can be recorded and saved to random access memory.

In step 805, speech processor hardware can process the digital first utterance with a first accent category model. This can be implemented as described above to recognize the sound \'tü\ from the recording by treating the sound as though it was spoken by a speaker of a Germanic mother tongue.

Step 810 can be implemented similarly to step 805, by substituting an Italic accent category model for Germanic.

In step 815, a category of accents can be selected based on the processing results. Step 815 can be as simple as determining if Germanic or Italic produced a higher recognition score.

In step 820, a plurality of accent models may be selected. In this example, referring to FIG. 5, this can be accomplished by selecting North Germanic and West Germanic.

In step 825, a digital representation of a second human utterance from the non-transitory computer readable storage medium can be loaded. Continuing with the example, the utterance may be \'zē\ because the caller said "zero" or \'z ē-(•)rō\.

In step 830, the digital second utterance can be processed as though it were spoken by either a North Germanic mother tongue, or a West Germanic Mother tongue.

Steps 805-830 can be repeated as the caller continues. In this example, once a leaf node if reached, perhaps "Dutch" in FIG. 5, future utterances can be processed as though they are spoken with a Dutch accent.

In step 835, the results are fused. Ideally, in this example, the recognition output begins with "two, zero."

Exemplary Computer System

Figure 9:
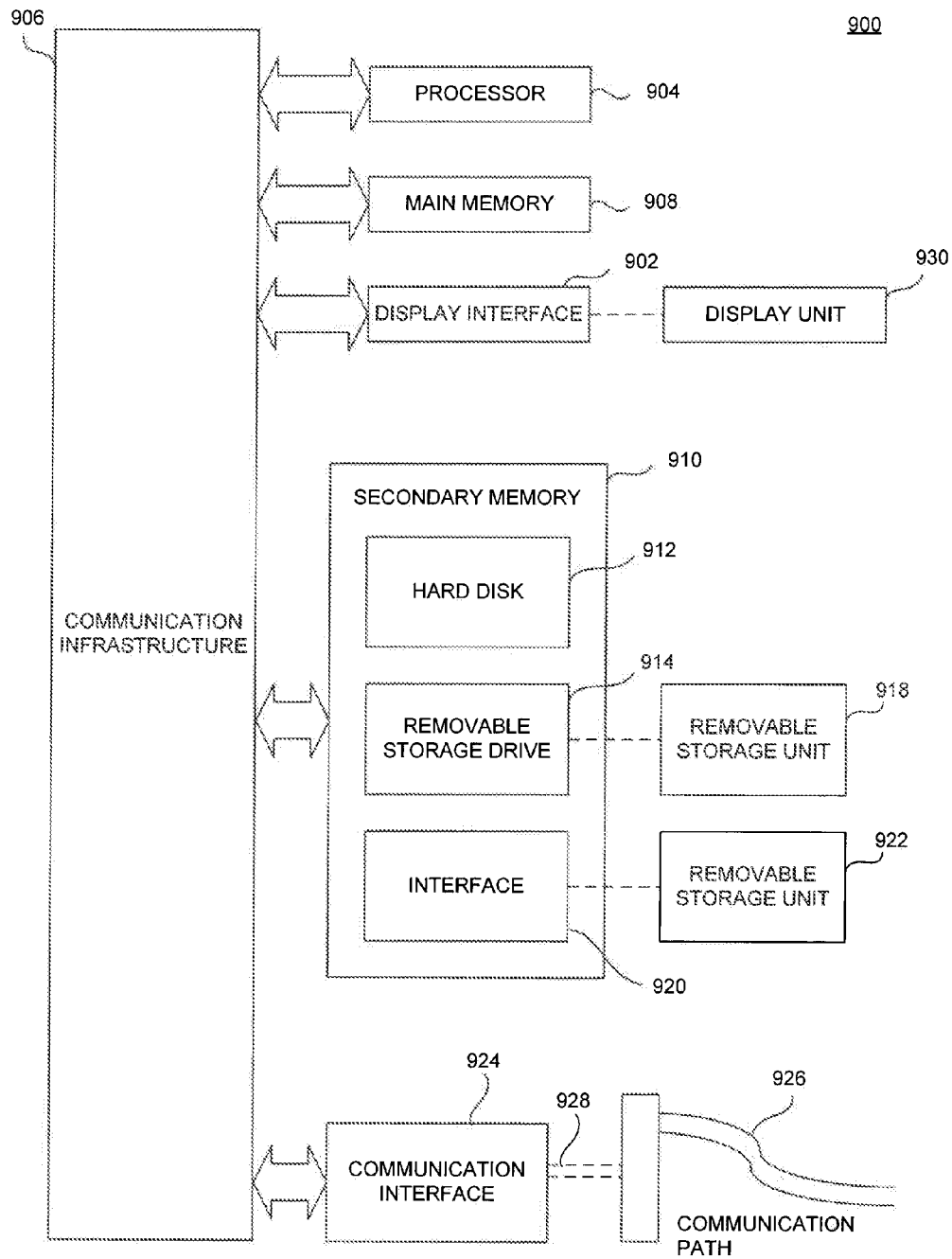
FIG. 9 is an illustration of an exemplary computer system in which embodiments, or portions thereof, can be implemented.

Various aspects of the above embodiments may be implemented in software, firmware, hardware, or a combination thereof. FIG. 9 is an illustration of an example computer system 900 in which embodiments disclosed herein, or portions thereof, can be implemented as computer-readable code. For example, the method illustrated by flowchart 800 of FIG. 8 or the systems of FIGS. 1-7 (including the data structure of FIG. 5) can be implemented in system 900. After reading this description, it will become apparent to a person skilled in the relevant art how to implement embodiments disclosed herein using other computer systems and/or computer architectures.

It should be noted that the simulation, synthesis and/or manufacture of various embodiments disclosed herein can be accomplished, in part, through the use of computer readable code, including general programming languages (such as C or C++), hardware description languages (HDL) such as, for example, Verilog HDL, VHDL, Altera HDL (AHDL), or other available programming and/or schematic capture tools (such as circuit capture tools). This computer readable code can be disposed in any known computer-usable medium including a semiconductor, magnetic disk, optical disk (such as CD-ROM, DVD-ROM). As such, the code can be transmitted over communication networks including the Internet. It is understood that the functions accomplished and/or structure provided by the systems and techniques described above can be represented in a core (e.g., an APU core) that is embodied in program code and can be transformed to hardware as part of the production of integrated circuits.

Computer system 900 includes one or more processors, such as processor 904. Processor 904 may be a special purpose or a general-purpose processor such as, for example, the APU and CPU of FIG. 4, respectively. Processor 904 is connected to a communication infrastructure 906 (e.g., a bus or network).

Computer system 900 also includes a main memory 908, preferably random access memory (RAM), and may also include a secondary memory 910. Secondary memory 910 can include, for example, a hard disk drive 912, a removable storage drive 914, and/or a memory stick. Removable storage drive 914 can include a floppy disk drive, a magnetic tape drive, an optical disk drive, a flash memory, or the like. The removable storage drive 914 reads from and/or writes to a removable storage unit 918 in a well-known manner. Removable storage unit 918 can comprise a floppy disk, magnetic tape, optical disk, etc. which is read by and written to by removable storage drive 914. As will be appreciated by persons skilled in the relevant art, removable storage unit 918 includes a computer-usable storage medium having stored therein computer software and/or data.

Computer system 900 (optionally) includes a display interface 902 (which can include input and output devices such as keyboards, mice, etc.) that forwards graphics, text, and other data from communication infrastructure 906 (or from a frame buffer not shown) for display on display unit 930.

In alternative implementations, secondary memory 910 can include other similar devices for allowing computer programs or other instructions to be loaded into computer system 900. Such devices can include, for example, a removable storage unit 922 and an interface 920. Examples of such devices can include a program cartridge and cartridge interface (such as those found in video game devices), a removable memory chip (e.g., EPROM or PROM) and associated socket, and other removable storage units 922 and interfaces 920 which allow software and data to be transferred from the removable storage unit 922 to computer system 900.

Computer system 900 can also include a communications interface 924. Communications interface 924 allows software and data to be transferred between computer system 900 and external devices. Communications interface 924 can include a modem, a network interface (such as an Ethernet card), a communications port, a PCMCIA slot and card, or the like. Software and data transferred via communications interface 924 are in the form of signals which may be electronic, electromagnetic, optical, or other signals capable of being received by communications interface 924. These signals are provided to communications interface 924 via a communications path 926. Communications path 926 carries signals and can be implemented using wire or cable, fiber optics, a phone line, a cellular phone link, a RF link or other communications channels.

In this document, the terms "computer program medium," "computer readable medium" and "computer-usable medium" are used to generally refer to media such as removable storage unit 918, removable storage unit 922, and a hard disk installed in hard disk drive 912. Computer program medium, computer readable medium and computer-usable medium can also refer to memories, such as main memory 908 and secondary memory 910, which can be memory semiconductors (e.g., DRAMs, etc.). These computer program products provide software to computer system 900.

Computer programs (also called computer control logic) are stored in main memory 908 and/or secondary memory 910. Computer programs may also be received via communications interface 924. Such computer programs, when executed, enable computer system 900 to implement embodiments as discussed herein. In particular, the computer programs, when executed, enable processor 904 to implement the method illustrated by flowchart 800 of FIG. 8 or the systems of FIGS. 1-7 (including the data structure of FIG. 5), as can be implemented in system 900, discussed above. Accordingly, such computer programs represent controllers of the computer system 900. Where embodiments disclosed herein are implemented using software, the software can be stored in a computer program product and loaded into computer system 900 using removable storage drive 914, interface 920, hard drive 912, or communications interface 924.

Embodiments disclosed herein are also directed to computer program products including software stored on any computer-usable medium. Such software, when executed in one or more data processing device, causes a data processing device(s) to operate as described herein. Such embodiments can employ any computer-usable or -readable medium, known now or in the future. Examples of computer-usable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage devices, etc.), and communication mediums (e.g., wired and wireless communications networks, local area networks, wide area networks, intranets, etc.).

It is to be appreciated that the Detailed Description section, and not the Summary and Abstract sections, is intended to be used to interpret the claims. The Summary and Abstract sections can set forth one or more but not all exemplary embodiments as contemplated by the inventors, and thus, are not intended to limit the appended claims in any way.

Embodiments have been described above with the aid of functional building blocks illustrating the implementation of specified functions and relationships thereof. Alternate boundaries can be defined so long as the specified functions and relationships thereof are appropriately performed.

The breadth and scope of the present disclosure should not be limited by any of the above-described exemplary embodiments, but should be defined only in accordance with the following claims and their equivalents.

What is claimed is:

1. A method for recognizing speech, comprising:
   loading a digital representation of a first human utterance;
   processing the digital first utterance with a first accent category model;
   processing the digital first utterance with a second accent category model;
   selecting a category of accents based on results from the processing the first accent category model and the processing the second accent category model;
   selecting a plurality of accent models belonging to the selected category of accents;
   loading a digital representation of a second human utterance;
   processing, in parallel, the digital second utterance with each of the selected plurality of accent models; and
   fusing the results of the processing the digital second utterance to produce a recognition output.

2. The method for recognizing speech of claim 1, wherein the selecting the plurality of accent models comprises traversing a tree data structure of accents.

3. The method for recognizing speech of claim 1, wherein the processing the digital first utterance with a first accent category model is based on an accent dictionary.

4. The method for recognizing speech of claim 1, wherein the processing the digital first utterance with a first accent category model is based on a language model.

5. The method for recognizing speech of claim 1, wherein the processing the digital first utterance with the first and second accent category models is performed in parallel, and wherein the fusing comprises selecting a highest scored result from the results from the processing the first and second accent category models.

6. The method for recognizing speech of claim 1, wherein the processing the digital first utterance with the first and second accent category models is performed in parallel, and wherein the fusing comprises selecting a highest scored complementary result from the results from the processing the first and second accent category models.

7. The method for recognizing speech of claim 1, wherein the fusing further comprises storing an identified accent to a non-transitory computer readable storage medium.

8. The method for recognizing speech of claim 1, wherein the loading the digital representation of the first human utterance comprises receiving the first human utterance from a voice control application.

9. The method for recognizing speech of claim 1, further comprising a second method of speech recognition.

10. An apparatus for speech processing, comprising:
    a first comparison module configured to determine a selected accent category based on whether a first accent category model or a second accent category model is a better match for a first human sound to be captured from an audio transducer; and
    a second comparison module configured to determine which accent model of a plurality of accent models is a best match for a second human sound to be captured from the audio transducer, wherein the plurality of accent models is associated with the selected accent category, and wherein at least one of the first or second comparison modules includes parallel processors.

11. The apparatus for speech processing of claim 10, wherein the first comparison module is configured to access the first accent category model and the second accent category model from a tree data structure.

12. The apparatus for speech processing of claim 10, further comprising an accent dictionary.

13. The apparatus for speech processing of claim 10, further comprising a language model.

14. A non-transitory computer readable storage medium, comprising:
   instructions for a processor to process a first accent category model and a second accent category model, wherein at least one of the first or second accent category models comprise Spanish, French, or both;
   conditional instructions to process a first plurality of accent models based on a result of the first accent category model; and
   wherein accents represented in the first plurality of accent models are within a category represented by the first accent category model.

15. The non-transitory computer readable storage medium of claim 14, wherein at least one of the first accent category model or the second accent category model are represented in a tree data structure.

16. The non-transitory computer readable storage medium of claim 15, further comprising an accent dictionary.

17. The non-transitory computer readable storage medium of claim 14, further comprising a language model.

* * * * *